(12) United States Patent
Lai

(10) Patent No.: US 10,750,406 B2
(45) Date of Patent: Aug. 18, 2020

(54) METHOD OF DISTRIBUTING UPLINK DATA FLOW BETWEEN DIFFERENT ACCESS NETWORKS IN 5G COMMUNICATION SYSTEM AND USER EQUIPMENT USING THE SAME

(71) Applicant: Industrial Technology Research Institute, Hsinchu (TW)

(72) Inventor: Chia-Lin Lai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/222,984

(22) Filed: Dec. 17, 2018

(65) Prior Publication Data

US 2019/0306752 A1 Oct. 3, 2019

Related U.S. Application Data

(60) Provisional application No. 62/651,207, filed on Apr. 1, 2018.

(51) Int. Cl.
*H04W 28/08* (2009.01)
*H04W 28/02* (2009.01)
(Continued)

(52) U.S. Cl.
CPC .......... *H04W 28/085* (2013.01); *H04L 45/38* (2013.01); *H04W 28/0215* (2013.01);
(Continued)

(58) Field of Classification Search
CPC .. H04L 45/38; H04W 28/0215; H04W 28/08; H04W 28/085; H04W 48/00;
(Continued)

(56) References Cited

U.S. PATENT DOCUMENTS

| 8,977,263 B2 | 3/2015 | Chin et al. |
| 2010/0105376 A1 | 4/2010 | Choudhary |

(Continued)

FOREIGN PATENT DOCUMENTS

| CN | 104427568 | 3/2015 |
| EP | 2804426 | 11/2014 |
| TW | I601394 | 10/2017 |

OTHER PUBLICATIONS

Péter Szilágyi, "Faster MPTCP Sub-flow Establishment for Interactive Applications," 2017 IEEE 28th Annual International Symposium on Personal, Indoor, and Mobile Radio Communications (PIMRC), Oct. 2017, pp. 1-7.

(Continued)

*Primary Examiner* — Kan Yuen
(74) *Attorney, Agent, or Firm* — JCIPRNET

(57) ABSTRACT

In an aspect, the disclosure provides a method for distributing uplink data flow between different access networks in a 5G communication system. The method would include not limited to maintaining an ATSSS rules table; receiving a request to establish an uplink data flow to a DN; determining from the ATSSS rule table whether the DN is in the ATSSS rule table in response to receiving the request to establish the uplink data flow to the DN; selecting a first PDU session from the ATSSS rule table for the uplink data flow to the DN in response to having been determined that the DN is in the ATSSS rule table; and creating a second PDU session for the uplink data flow to the DN and recording the second PDU session in the ATSSS rule table in response to having been determined that the DN is not in the ATSSS rule table.

20 Claims, 11 Drawing Sheets

(51) Int. Cl.
*H04W 48/18* (2009.01)
*H04W 88/06* (2009.01)
*H04L 12/721* (2013.01)

(52) U.S. Cl.
CPC .......... *H04W 28/08* (2013.01); *H04W 48/18* (2013.01); *H04W 88/06* (2013.01)

(58) Field of Classification Search
CPC ..... H04W 48/17; H04W 48/18; H04W 48/20; H04W 76/10; H04W 76/16; H04W 80/10; H04W 88/06
See application file for complete search history.

(56) References Cited

U.S. PATENT DOCUMENTS

| | | | |
|---|---|---|---|
| 2010/0208649 | A1 | 8/2010 | Chang et al. |
| 2011/0013577 | A1 | 1/2011 | Wang et al. |
| 2016/0345203 | A1* | 11/2016 | Lim ............... H04W 28/08 |
| 2017/0118706 | A1 | 4/2017 | Wang et al. |
| 2017/0332282 | A1 | 11/2017 | Dao |
| 2018/0288823 | A1* | 10/2018 | Hampel ............. H04W 24/02 |
| 2019/0274178 | A1* | 9/2019 | Salkintzis ......... H04W 76/16 |

OTHER PUBLICATIONS

Itri, "Update separate establishment for a MA-PDU Session in Solution 2," SA WG2 Meeting #127, Apr. 2018, pp. 1-2.
Apple, Inc., Deutsche Telekom, "23.793: New solution: MPTCP proxy architecture," SA WG2 Meeting #127, Apr. 2018, pp. 1-5.
Nokia, Nokia Shanghai Bell, "Architecture framework with ATSSS rules and UP Access Agnostic Reporting Control Protocol," SA WG2 Meeting #127, Apr. 2018, pp. 1-5.
Motorola Mobility, Lenovo, "Solution 2 Update: NW-Requested Establishment of MA-PDU session," SA WG2 Meeting #127, Apr. 2018, pp. 1-6.
BT PLC, Broadcom, Deutsche Telekom, "Architectural Updates for ATSSS Solution 1," SA WG2 Meeting #127, Apr. 2018, pp. 1-15.
"Search Report of Europe Counterpart Application", dated May 28, 2019, pp. 1-10.
Huawei (Rapporteur), "TS 23.50x: Moving remaining sections from 23.501 Annex A into new TS", SA WG2 Meeting #122E e-meeting, Sep. 11-15, 2017, pp. 1-12.
LG Electronics, "ATSSS Solution Multi-Access PDU Session Establishment", SA WG2 Meeting #126, Feb. 22-Mar. 2, 2018, pp. 1-8.
Samsung, "TR 23.793: ATSSS architecture updates", SA WG2 Meeting #126, Feb. 26-Mar. 2, 2018, pp. 1-4.
Interdigital Inc., "Network-controlled Traffic Steering for Multi-access PDU Session", SA WG2 Meeting #126, Feb. 26-Mar. 2, 2018, pp. 1-4.

* cited by examiner

| UE ATSSS rule | Access type | PDU session id ordered by priority |
|---|---|---|
| DNN 1 | 3GPP | 1,2,3,... |
| | N3GPP | 4,5,6,... |
| DNN 2 | 3GPP | 7,8,9,... |
| | N3GPP | 4,5,6,... |
| DNN 3 | 3GPP | 10,11,12,... |
| | N3GPP | 13,14,15,... |

FIG. 2

METHOD OF DISTRIBUTING UPLINK DATA FLOW BETWEEN DIFFERENT ACCESS NETWORKS IN 5G COMMUNICATION SYSTEM AND USER EQUIPMENT USING THE SAME

CROSS REFERENCE TO RELATED APPLICATION

This application claims the priority benefit of U.S. provisional application Ser. No. 62/651,207, filed on Apr. 1, 2018. The entirety of the above-mentioned patent application is hereby incorporated by reference herein and made a part of specification.

TECHNICAL FIELD

The disclosure is directed to a method of distributing data flow between different access networks in a fifth generation (5G) communication system and a user equipment (UE) using the same method.

BACKGROUND

Conventionally, a packet data unit (PDU) session involves managing a data routing path between a UE and a Data Network (DN) in 5G communication system. A UE or a 5GS may utilize a PDU session establishment procedure such as the procedure defined in TS 23.502 to create a PDU session to establish user traffic between a UE and one or more DNs. After establishing a PDU session, a UE may access services provided by the DNs. Specifically, the UE may map user traffic to a suitable Quality of Service (QoS) rule provided by the 5GS to transmit user traffic in the user plane. User Routing Selection Policy (URSP) rules could be provided by a 5GS or could be pre-configured within the UE to guide the UE to establish a data routing path on PDU sessions by using different access networks.

TABLE 1

| Information name | Description | Category | PCF permitted to modify in UE context | Scope |
| --- | --- | --- | --- | --- |
| Rule Precedence | Determines the order the URSP rule is enforced in the UE | Mandatory | Yes | UE Context |
| Traffic descriptor | Defines traffic descriptors of policy | | | |
| Application identifiers | Application identifier(s) | Optional | | |
| IP descriptors | IP 3 tuple(s) | Optional | Yes | UE Context |
| Non-IP descriptors | Descriptor(s) for non-IP traffic | Optional | Yes | UE Context |
| Route Selection descriptor | The components for Route selection (see Table 6.6.2-2) | Mandatory | | |

Table 1 shows an example of URSP rules provided by a Home Public Land Mobile Network (HPLMN) to a UE as defined by Table 6.6.2-1 of TS 23.503. The URSP rules may include (1) rule precedence which determines the order of the URSP rules that are enforced in the UE, (2) traffic descriptor which defines the traffic descriptors for the policy, (3) application identifier which contains an application identifier (ID), (4) IP descriptors which include an destination IP, address or IPv6 network prefix, destination port number, and protocol ID of the protocol above IP, (5) non-IP descriptors which include a descriptor for non-IP traffic, and (6) route selection descriptor which includes needed components for route selection.

Each URSP rule may contain a route selection descriptor which could be used to determine when a rule is applicable. Table 2 shows an example of Route Selection Descriptor provided by a Home Public Land Mobile Network (HPLMN) to a UE as defined by Table 6.6.2-2 of TS 23.503.

TABLE 2

| Information name | Description | Category | PCF permitted to modify UE in UE context | Scope |
| --- | --- | --- | --- | --- |
| Route selection components | Defines route selection components | Mandatory | | |
| SSC Mode Selection | | Optional | Yes | UE Context |
| Network Slice Selection | | Optional | Yes | UE Context |
| DNN Selection | | Optional | Yes | UE Context |
| Non-seamless Offload Indication | Indicates if traffic of matching application to be off-loaded to non-3GPP access outside of PDU session | Optional | Yes | UE Context |
| Access type precedence | Indicates the preferred Access type (3 GPP or non-3 GPP) when UE establishes PDU session for matching application | Optional | Yes | UE Context |

An application inside a UE could be analyzed to determine if any URSP is applicable for its data flow. The analyzed information may include (1) selection components, (2) Session and Service Continuity (SSC) mode selection, (3) network slice selection, (4) DNN selection, (5) non-seamless offload indication, and (6) access type. Therefore, UE may use the provisioned URSP rules to configure the data flow and to decide whether the UE would need to create new PDU sessions or use the current existing PDU sessions or release the current PDU sessions or modify the current PDU sessions.

In a 5GS, a UE may create a Multi-Access (MA) PDU session in which user plane traffic can be transmitted between a UE and a DN by using different access network simultaneously. FIG. 1 illustrates a network architecture through which a UE may communicate with a DN by using two different access networks. As illustrated in the FIG. 1, the may UE physically established two PDU sessions with two different access networks which are e.g., next generation radio access network (NG-RAN) and Wi-Fi, but the two PDU sessions are with the same data network. In other words, the UE may physically and independently utilize two different packet data routing paths to exchange the UE's user plane traffic to the same DN. According to URSP rules configured by 5GS, a UE may use stored URSP rules to decide which data packets would belong to which single-access PDU session. The UE may determine whether to use the existing PDU session or to create a PDU session. The stored URSP rules could be updated by the 5GS as needed based on a current 5GS procedure.

Based on the above description, it can be known that a PDU session is only applicable to only one type of access network as currently defined by the 5GS, and a UE may utilize one or more PDU sessions on one type of network and one or more other PDU sessions on another type of access network. However, the UE may not be able to use the PDU sessions efficiently to connect to a specific DN when multiple PDU sessions are created across multiple types of access technologies. For example, referring to FIG. 1, if a UE were to have a new data flow which transmits user plane traffic to a DN, and both existing PDU sessions would be able to satisfy the QoS requirements, then it would be unclear which access network should be used to transmit a data traffic between the UE and the DN.

For another example, if a UE has established an existing PDU session through a NG-RAN to exchange data traffic between the UE and a DN, but later on the UE has detected that the PDU session is better off switched to Wi-Fi which provides a better performance, then it is unclear how the UE would switch the current PDU session to a different session with the Wi-Fi. Also, if this UE has the ability to use both access networks simultaneously, then it is unclear how the UE should split the data traffic between the two access networks in order to communicate with the DN.

Even though the 5G-UE may be able to simultaneously use multiple access networks including a 3GPP network and a Non-3GPP network to establish a multi-access data connection (i.e., MA-PDU Session) with same Data Network (DN), currently there is no established way to establish a MA-PDU Session, and there is no established way for a UE to transmit UL data traffic by steering a data traffic between multiple access networks.

SUMMARY OF THE DISCLOSURE

Accordingly, the present disclosure is directed to a method of distributing data flows between different access networks in a 5G communication system and a UE using the same method.

In one of the exemplary embodiments, the present disclosure is directed to a method used by a UE for distributing data flows between different access networks in a 5G communication system. The method would include not limited to: maintaining an ATSSS rule(s) table; receiving a request to establish an uplink data flow to a DN; determining from the ATSSS rule table whether the DN is in the ATSSS rule table in response to receiving the request to establish the uplink data flow to the DN; selecting a first PDU session from the ATSSS rule table for the uplink data flow to the DN in response to having been determined that the DN is in the ATSSS rule table; creating a second PDU session for the uplink data flow to the DN and recording the second PDU session in the ATSSS rule table in response to having been determined that the DN is not in the ATSSS rule table.

In one of the exemplary embodiments, the present disclosure is directed to a UE which includes not limited to: a transceiver; and a processor coupled to the transceiver and configured to: maintain an ATSSS rules table; receive a request to establish an uplink data flow to a DN; determine from the ATSSS rule table whether the DN is in the ATSSS rule table in response to receiving the request to establish the uplink data flow to the DN; select a first PDU session from the ATSSS rule table for the uplink data flow to the DN in response to having been determined that the DN is in the ATSSS rule table; and create a second PDU session for the uplink data flow to the DN and recording the second PDU session in the ATSSS rule table in response to having been determined that the DN is not in the ATSSS rule table.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 illustrates an ATSSS rule table which is generated by a UE according to URSP rules provided by a 5G communication system in accordance with one of the exemplary embodiments of the disclosure.

DETAILED DESCRIPTION OF DISCLOSED EMBODIMENTS

Figure 1:
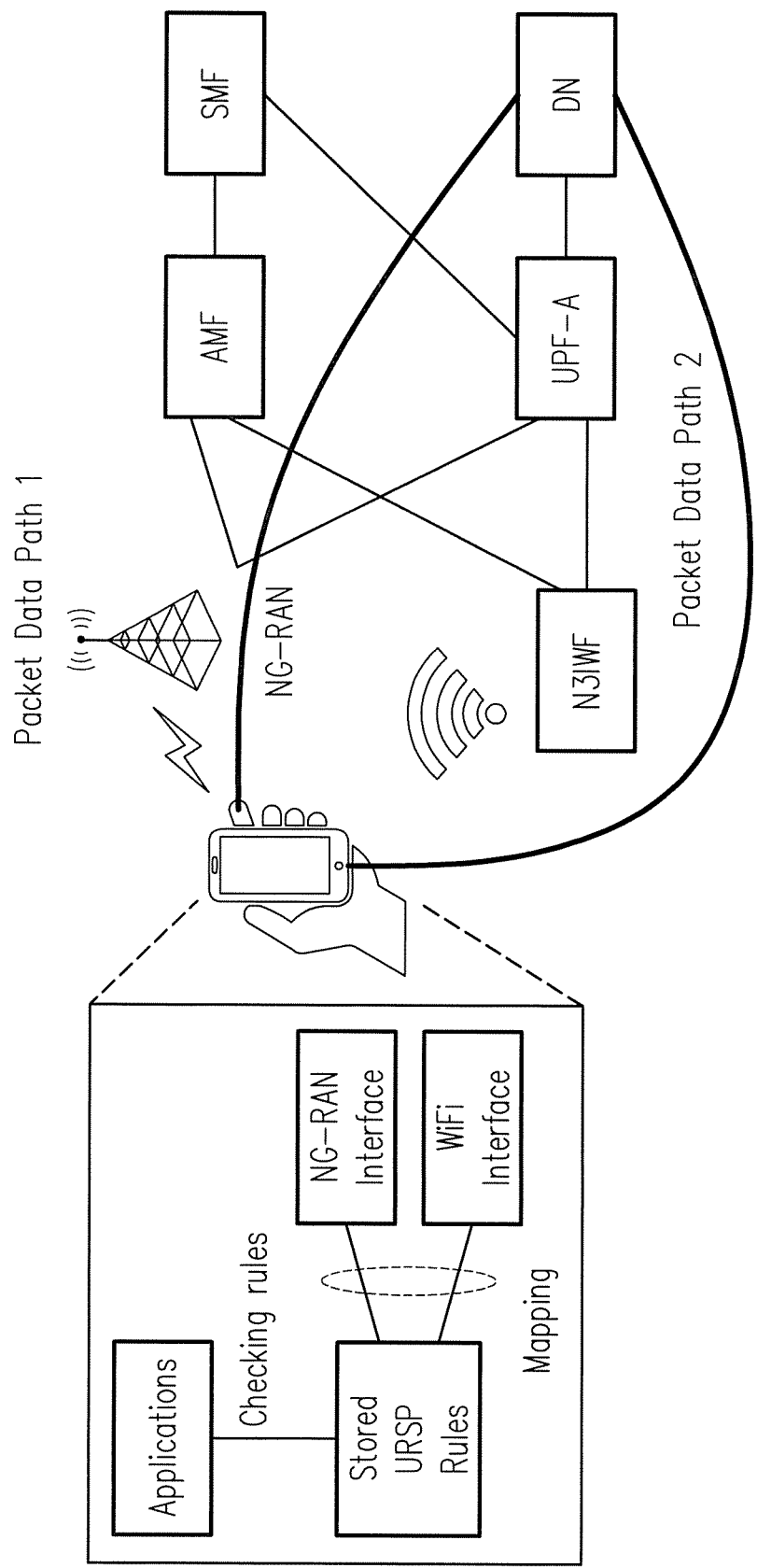
FIG. 1 illustrates a UE using at least two different access networks to exchange user plane traffic with the same DN.

Reference will now be made in detail to the present exemplary embodiments of the disclosure, examples of which are illustrated in the accompanying drawings. Wherever possible, the same reference numbers are used in the drawings and the description to refer to the same or like parts.

In order to resolve the above described challenges, this disclosure provides a method and a UE for distributing data flow between different access networks in a fifth generation (5G) communication system. In this disclosure, a UE may steer or switch or split an uplink (UL) data flow which is transmitted through packet data unit (PDU) sessions across different types of access networks. Once a UE simultaneously connects to multiple access networks, the UE may establish a Multiple Access PDU (MA-PDU) Session while self-selecting a rule to steer or switch or split an UL data flow within or from this MA-PDU session. For example, a UE may simultaneously connect to a DN through a Wi-Fi access network which accesses the DN through an unlicensed spectrum and also connect to the DN through a 3GPP access network which accesses the DN through a licensed spectrum. A UE may allocate data to be transmitted via a MA-PDU session by selecting one of multiple rules (e.g. steering modes). The steering modes may include active-standby mode, priority-based mode, best access mode, redundant mode, load balance mode, etc. These steering modes will be explained in further details.

A UE may steer or switch or split an uplink data flow through one or more the PDU sessions across different access networks by generating and using an Access Traffic Steering, Switching, Splitting rules (ATSSS) table to process an uplink data flow to one or more DNs by establishing or by using pre-existing established PDU sessions across different access networks. FIG. 2 illustrates an example of such ATSSS rule table. The UE may receive URSP rules which are shown previously in Table 1 and Table 2 and are provided by a 5G communication system. The UE may then generate and maintain an ATSSS rule table based on the URSP rules provided by a 5G communication system.

It is worth noting that although the URSP could be provided to the UE to route uplink data traffic by using an established PDU session or by generating a new PDU session. Whenever the UE initiates an uplink data transmission, the UE may select or create a PDU session on a specific type of access network and may need to check the URSP rules in order to know how to transmit the uplink data transmission. However, the URSP rules are configured and maintained by the Home Public Land Mobile Network (HPLMN) which does not necessarily know the traffic status of each individual UE, and also, the URSP rules are not made for MA-PDU session. Such restriction may cause inefficiency of the overall network. For example, assuming that a UE has matched one URSP rule, the UE would accordingly transmit an uplink traffic flow by using PDU session 1 transmitted on a 3GPP access network. However, if the PDU session 1 is under congestion and this PDU has a higher precedence than other PDU sessions, the UE may still need to apply the URSP rule and transmit the uplink traffic flow by staying on PDU session 1 transmitted on the same 3GPP access network. Such scenario would likely lower the efficiency of the MA-PDU session even though the MA-PDU session may actually contain more than one possible data routing paths to the same DN. Therefore, in order to efficiently make use of MA-PDU sessions, this disclosure proposes that the UE would generate an ATSSS rule table such as the one show in FIG. 2 based on URSP rules received from the 5GS.

Referring to FIG. 2, the table may record one or more DNNs 201 for each UE to connect to, and each of the DNNs 201 could be connected to through one or more types 202 of access networks which may include but not limited to a 3GPP access network and a Non-3GPP (N3GPP) access network. Each of the access network could be associated with one or more pre-existing PDU sessions as each of the pre-existing PDU sessions corresponds to a different PDU session identifier (ID). Each ID would be unique within the entire ATSSS rule table. As shown in FIG. 2, the UE has already connected to DNN1 through a 3GPP network by using PDU sessions 203a which include PDU session 1, PDU session 2, and session 3. Since the PDU session IDs are listed in the order to priority, PDU session 1 has higher priority than PDU session 2 which has higher priority than PDU session 3. Similarly, PDU sessions 203b of the N3GPP access network would also be listed in the order of PDU priority. These PDU session IDs could be listed in according to a priority weight for calculating over priority according to the URSP rules. Therefore, a UE would check the ATSSS rule table to know which PDU session could be used to transmit the uplink traffic flow. The way to use the ATSSS rule table is more apparent upon further elucidation of the procedures to steer, switch, and split an uplink data flow.

Figure 3:
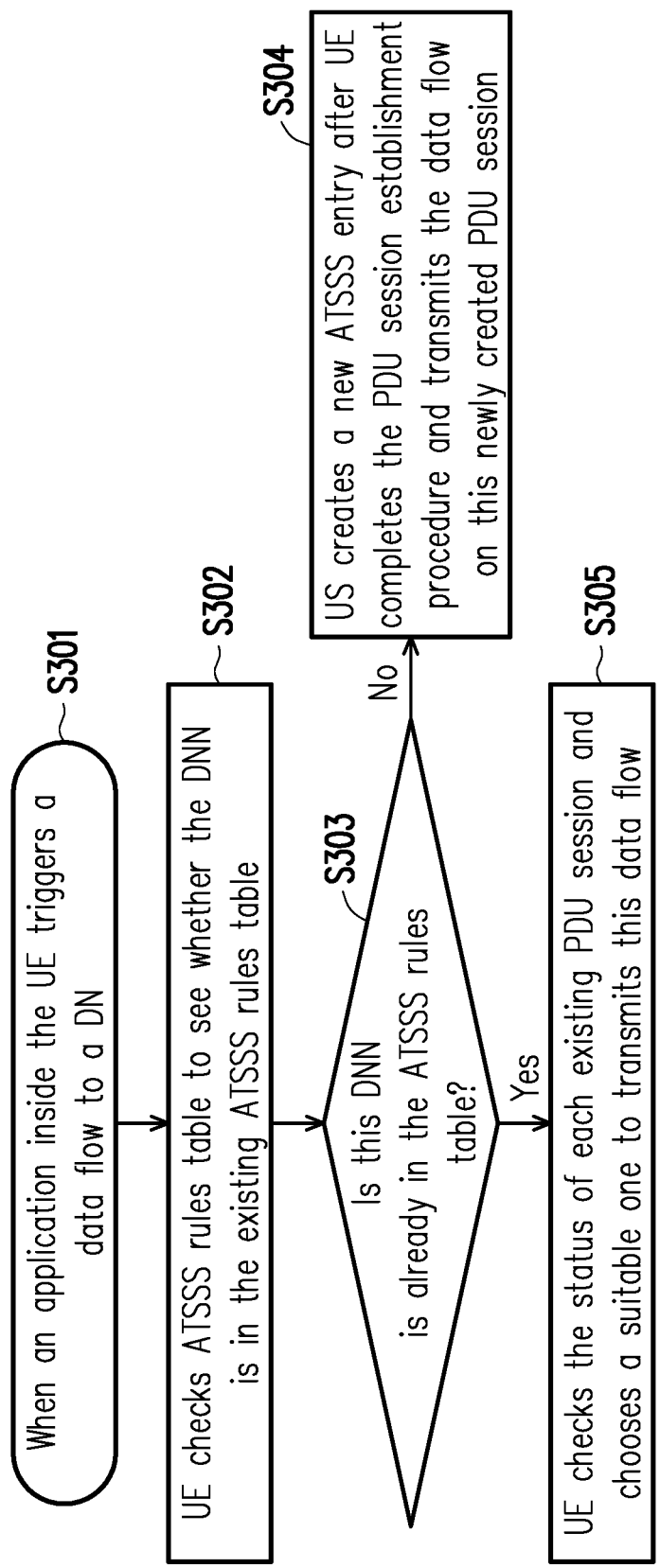
FIG. 3 is a flow chart which illustrates the procedures of a UE steering a data flow in accordance with one of the exemplary embodiments of the disclosure.

The procedures of a UE steering an uplink data flow is shown in FIG. 3. Referring to FIG. 3, in step S301, an application of a UE is assumed to have triggered an uplink data flow to a DN associated with a DNN. In step S302, the UE would check ATSSS rules table stored within the UE to determine whether the DNN already exists in the ATSSS rules table. In step S303, if the DNN is not already in the ATSSS rules table, then in step S304, the UE would create a new PDU session with this DNN and would initiate a PDU session establishment procedure. After the UE completes the PDU session establishment procedure, the UE would transmit the uplink data flow on this newly created PDU session. In step S303, if the DNN is already in the ATSSS rules table, then in step S305, the UE would check the status of each existing PDU session and chooses a suitable one to transmit this uplink data flow of the application.

For example, referring to FIG. 2, it is assumed that an application of a UE wants to transmit uplink data to DNN4, the UE would check the ATSSS rules table to determine if DNN4 is already in the ATSSS rules table. Since DNN4 is not already in the ATSSS rules table of FIG. 2, the UE would create a new PDU session which is associated with PDU session ID 16. Assuming that the UE wants to transmit the uplink data to DNN1, the UE would check the status of PDU session 1, PDU session 2, PDU session 3 and select the most suitable PDU session for transmitting the uplink data.

Figure 4:
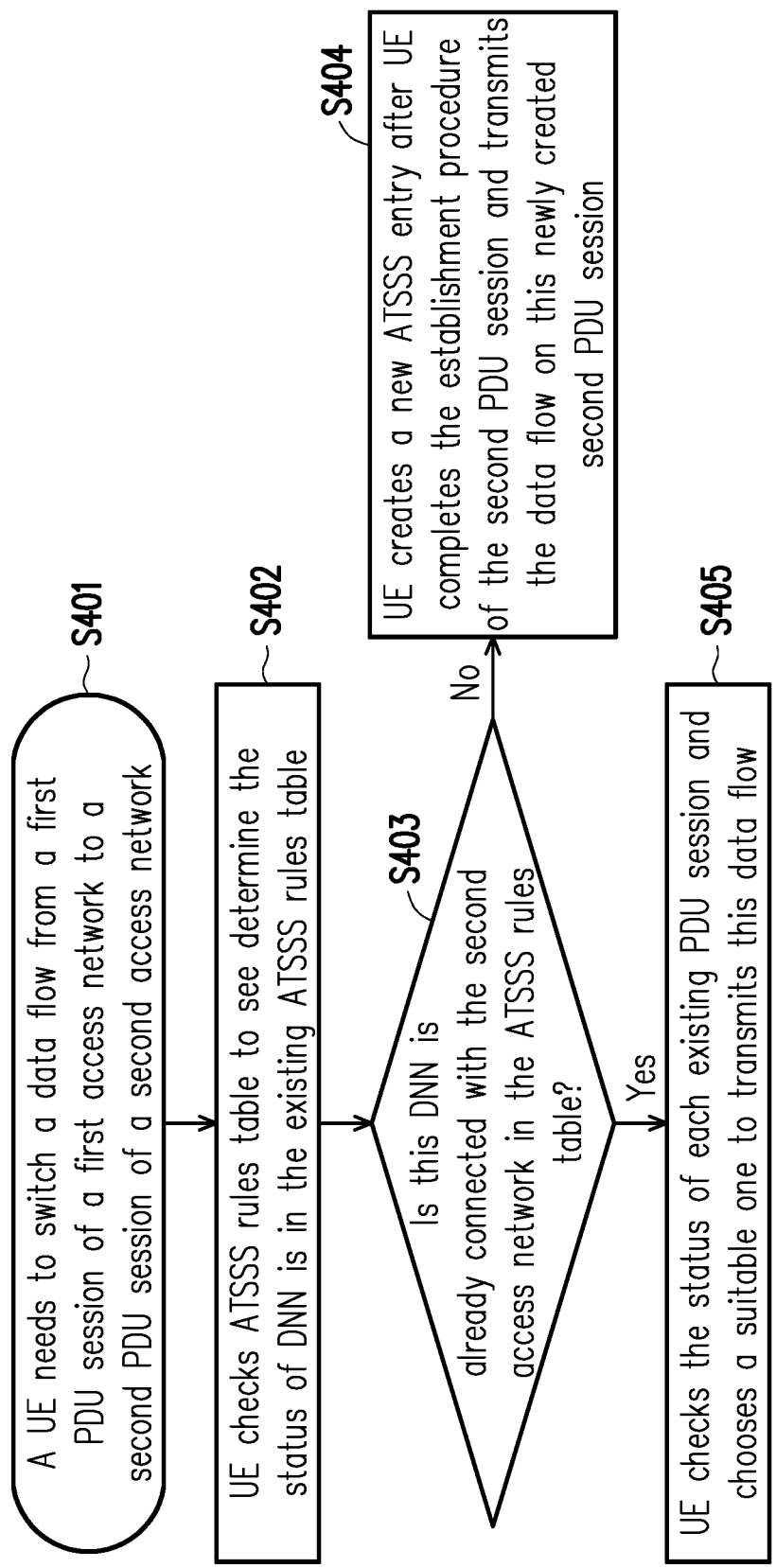
FIG. 4 illustrates a flow chart which illustrates the procedures of a UE switching a data flow in accordance with one of the exemplary embodiments of the disclosure.

FIG. 4 illustrates a flow chart which illustrates the procedure of a UE switching a data flow in accordance with one of the exemplary embodiments of the disclosure. In step S401, it is assumed that a UE has determined that the UE will need to switch a data flow from a first PDU session of a first access network to a second PDU session of a second access network. In step S402, the UE would check the ATSSS rules table to determine whether the DNN is already in the ATSSS rules table. In step S403, assuming that this DNN is not connected with the second access network in the ATSSS rules, then in step S404, the UE would initiate an establishment procedure with the second PDU session of the second access network. After the UE completes the establishment procedure of the second PDU session, the UE would transmit the data flow on this newly created second PDU session. In step S403, assuming that this DNN has connected with the second access network in the ATSSS rules, then in step S405, the UE would check the status of each existing PDU session and choose a suitable one to transmits this data flow.

For example, referring to FIG. 2, it is assumed that a UE was previously using PDU session ID 1 of a 3GPP access network to transmit uplink data to DNN1, but the UE wants to switch the uplink data flow to be through a N3GPP network, then the UE would check the ATSSS rules table to determine if DNN1 is already in the ATSSS rules table. Since DNN1 is already in the ATSSS rules table, the UE would check the status of PDU session 4, PDU session 5, PDU session 6 and select the most suitable PDU session from among PDU session 4, 5, and 6 for transmitting the uplink data according to the priority. The priority can be calculated according to different factors, e.g., access network throughput, the signal of the access networks, etc.

Figure 5:
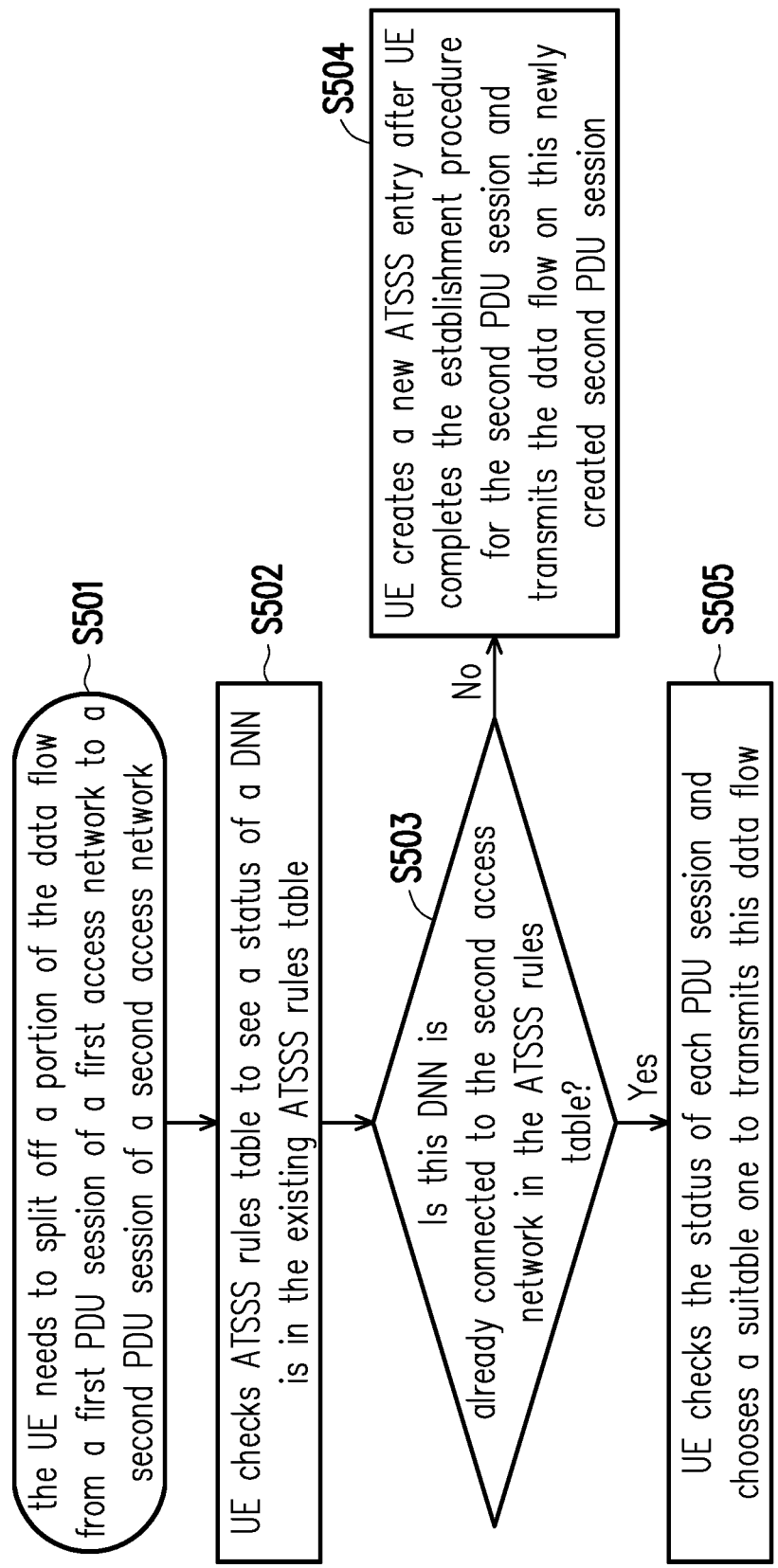
FIG. 5 illustrates a flow chart which illustrates the procedures of a UE splitting a data flow in accordance with one of the exemplary embodiments of the disclosure.

FIG. 5 illustrates a flow chart which illustrates the procedure of a UE splitting a data flow in accordance with one of the exemplary embodiments of the disclosure. In step S501, the UE has determined that the UE will need to split off a portion of the uplink data flow from a first PDU session of a first access network to a second PDU session of a second access network. In step S502, the UE would check the ATSSS rules table to see whether the DNN is already in the ATSSS rules table. In step S503, it is assuming that the UE has determined that this DNN is already connected to the second access network in the ATSSS rules table, then in step S505, the UE would initiate a connection establishment procedure for the second PDU session and transmit the uplink data flow on this newly created second PDU session. In step S503, it is assuming that the UE has determined that the DNN is not already connected to the second access network in the ATSSS rules table, then in step S504, UE would check the status of each PDU session and chooses a suitable one to transmit this data flow.

For example, referring to FIG. 2, it is assumed that a UE was previously using PDU session ID 1 of a 3GPP access network to transmit uplink data to DNN1, but the UE wants to split off a portion of the uplink data flow to be through a N3GPP network, then the UE would check the ATSSS rules table to determine if DNN1 is already in the ATSSS rules table. Since DNN1 is already in the ATSSS rules table, the UE would check the status of PDU session 4, PDU session 5, PDU session 6 and select the most suitable PDU session from among PDU session 4, 5, and 6 for transmitting the uplink data. In this way, the UE would create a MA-PDU session by simultaneously connecting to DNN1 through both the 3GPP access network and a N3GPP access network.

Figures 6A, 6B:
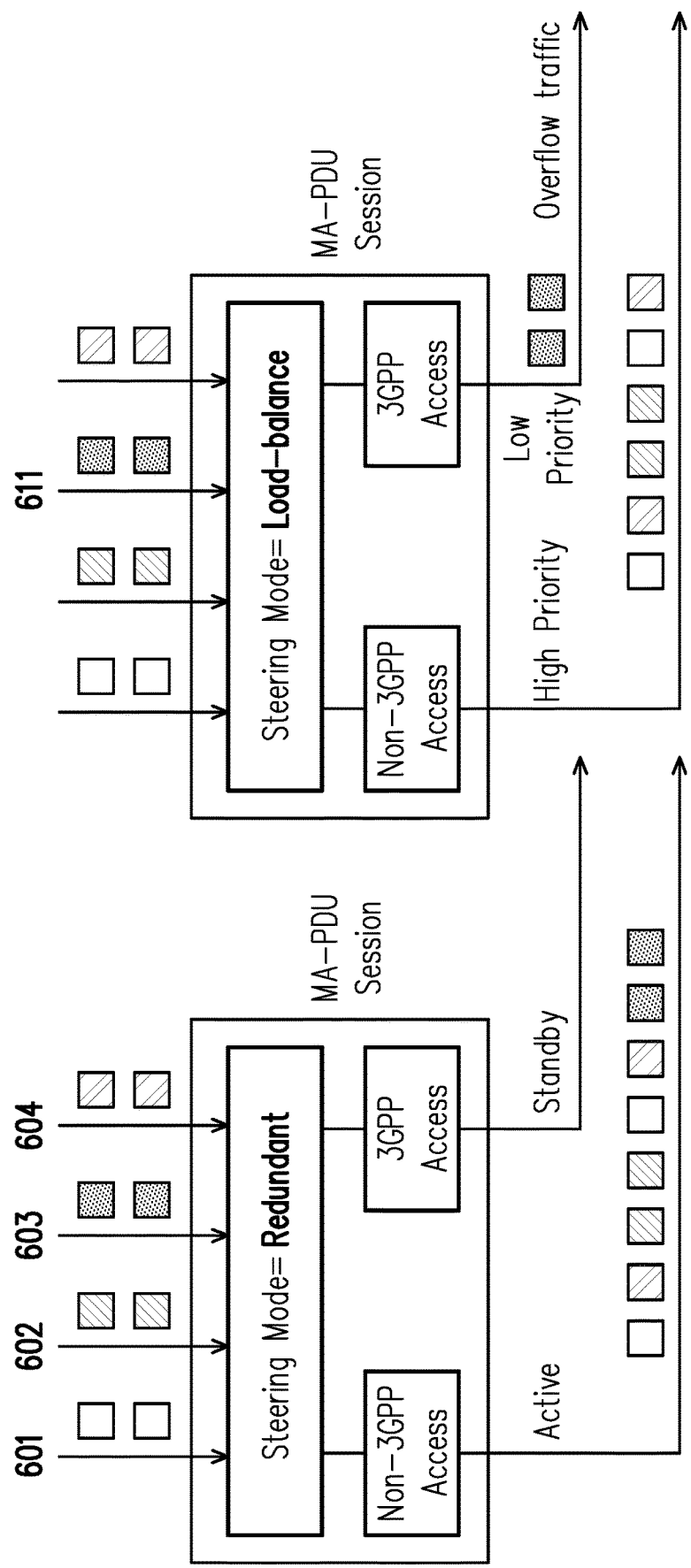
FIG. 6A to FIG. 6C illustrate different steering modes for a MA-PDU session in accordance with one of the exemplary embodiments of the disclosure.
Figure 6C:
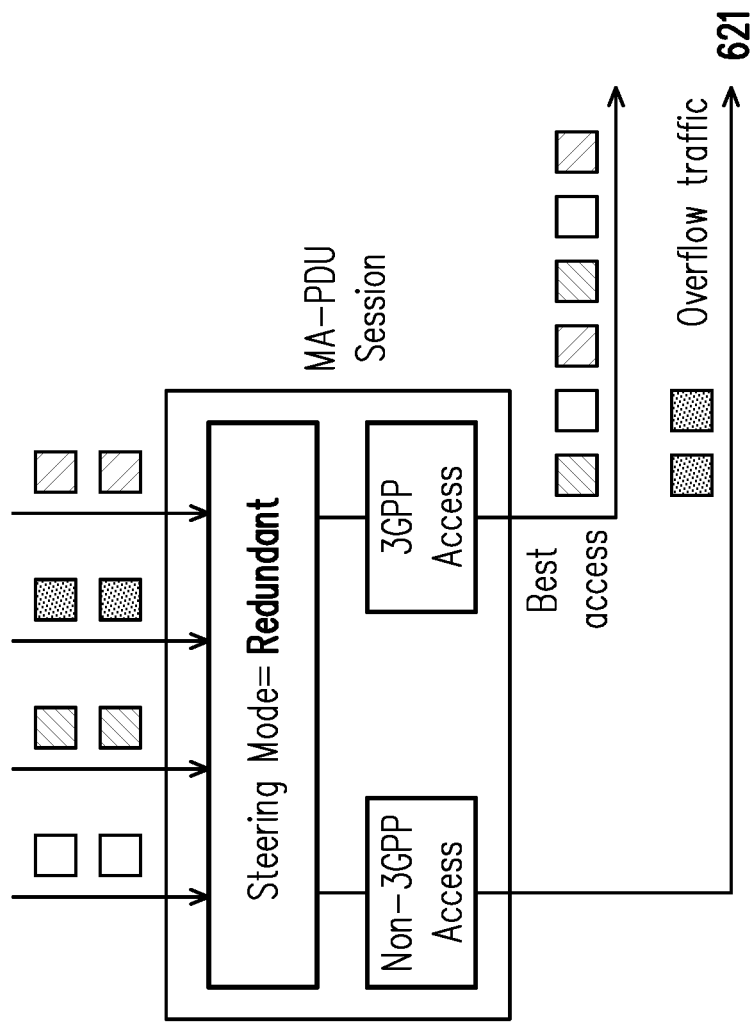
Figure 7:
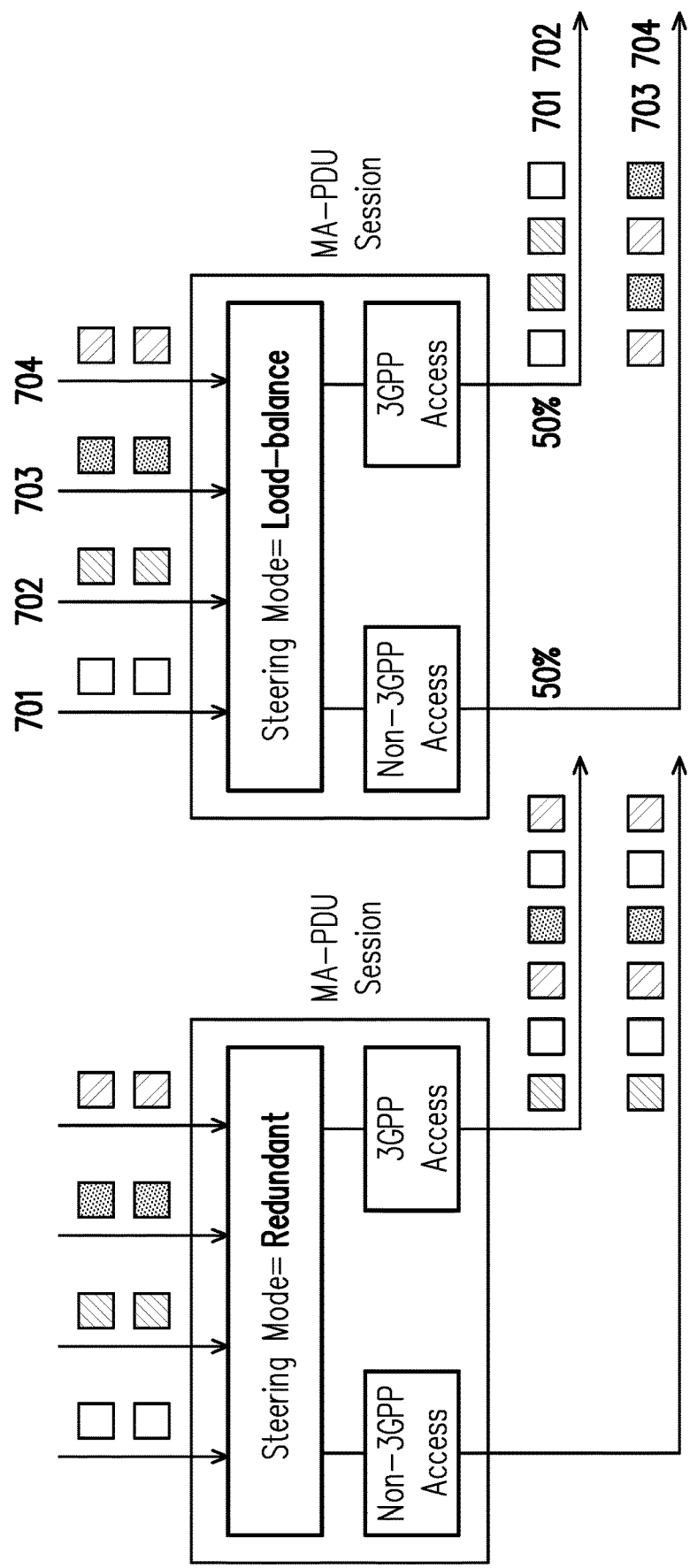
FIG. 7 illustrates different steering modes for a MA-PDU session in accordance with one of the exemplary embodiments of the disclosure.

FIG. 6 and FIG. 7 illustrate different steering modes for a MA-PDU session in accordance with one of the exemplary embodiments of the disclosure. A UE may transmit one or more data flows to a DN over a MA-PDU session by selecting one steering mode among multiple possible steering modes to distribute the data flows. The steering modes may include not limited to active standby, priority-based, best access, redundant, and load-balance. For the examples of FIG. 6A~6C and FIG. 7, it is assumed that there are multiple data flow 601 602 603 604 to be transmitted over a MA-PDU session. As seen in FIG. 6A, for the active-standby steering mode, all of the data flows 601 602 603 604 would be transmitted through a non-3GPP access network which is active, and none of the data flows 601 602 603 604 would be transmitted through a 3GPP access network which is in standby.

For the priority-based steering mode, a first type of access network could be considered high priority while a second type of access network could be considered low priority relative to the first type of access network. Thus, data flow(s) of relatively high priority would be transmitted through the access network which is high priority whereas data flow(s) of relatively low priority would be transmitted through the access network which is low priority. In the example of FIG. 6B, the non-3GPP access network would be high priority, and the 3GPP access network would be low priority, and thus data flows 601 602 604 which are considered high priority would be transmitted through the non-3GPP access network while data flow 603 which is considered low priority would be transmitted through the 3GPP access network.

For the best-access steering mode, the data flows 601 602 603 604 would be transmitted over a first type of access network which is considered to have the best performance unless there is any overflow which would be transmitted over a second type of access network assuming that the second type of access network has a worse performance than the first type of access network. In the example of FIG. 6C, 3GPP access network is assumed to have better performance than the non-3GPP access network and thus, initially, the data flows 601 602 603 604 could be attempted to be transmitted through the 3GPP access network. However, assuming that 3GPP access network is congested and cannot handle all of the data flows 601 602 603 604, and thus the overflow traffic which is data flow 603 would be transmitted over the non-3GPP access network.

For the redundant steering mode, one type of access network is to be used to transmit a plurality of data flows while another type of access network may contain at least a part of identical information as the one type of access network. For example, referring to FIG. 7, the data flows 701 702 703 704 are transmitted over the 3GPP access network while the identical data flows 701 702 703 704 are also transmitted over the non-3GPP access network. This steering mode could be used when data redundancy is needed or preferred.

For the load-balance steering mode, all of the data flows are equally distributed throughout all the access networks. For example, referring to FIG. 7, the 3GPP access network would process half of all the data flows of the MA-PDU session whereas the non-3GPP access network would process the other half of all the data flows of the MA-PDU session. Thus, the 3GPP access network would carry data flows 701 702 while the non-3GPP access network would carry data flows 703 704.

In an exemplary embodiment, the access traffic steering, switching and splitting decisions for a MA-PDU session could be based on a policy (i.e. ATSSS policy extended from URSP) that is provisioned in the UE and in the UPF of a 5G core network. The ATSSS policy could be created by the PCF during the establishment of a MA-PDU session. Under this assumption, the network may provide (a) The contents of the ATSSS policy; and (b) How the ATSSS policy can be applied for deciding how to distribute the traffic of a MA-PDU session. Thus, the traffic of the MA-PDU session could be distributed across the two accesses of the MA-PDU session by using different steering modes.

The steering modes discussed above could be applied in a MA-PDU session by enforcing the appropriate ATSSS policy for the MA-PDU session. For example, during the establishment of an MA-PDU session, the PCF in the network could create the ATSSS policy for the MA-PDU, which could then be transferred to UE for uplink traffic steering and to UPF for downlink traffic steering. The ATSSS policy may include a prioritized list of ATSSS rules and each ATSSS rule includes a steering mode that should be applied to the traffic matching this rule.

Figure 8:
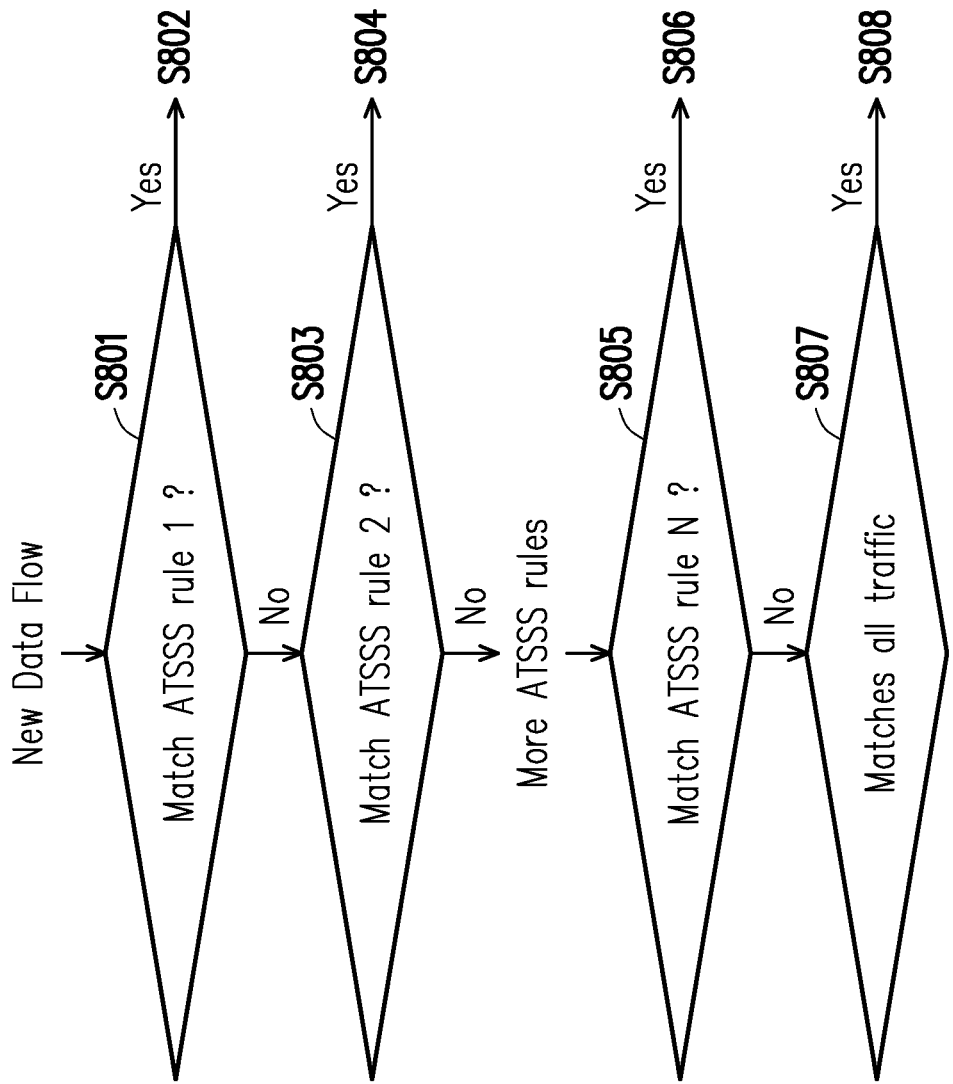
FIG. 8 illustrates an example of applying ATSSS to distribute an uplink data flow in accordance with one of the exemplary embodiments of the disclosure.

FIG. 8 illustrates an example of how a UE may apply ATSSS rules to distribute one or more uplink data flows of a MA-PDU across the 3GPP and the non-3GPP accesses. In step S801, the UE would determine whether an uplink data flow would satisfy ATSSS rule #1 which has been configured as an active-standby steering mode with the active access being a non-3GPP access network and the inactive access being a 3GPP access network. If yes, then in step S802, the UE would steer the uplink data flow to the non-3GPP access. However, if the non-3GPP access is not available, then the uplink data flow would be steered to the 3GPP access network. If in step S802, the uplink data flow does not satisfy the ATSSS rule #1, then the process proceeds in step S803.

In step S803, the UE would determine whether an uplink data flow would satisfy ATSSS rule #2 which has been configured as an active-standby steering mode with the active access being a 3GPP access network and the inactive access being no access. If yes, then in step S804, the UE would steer the uplink data flow to the 3GPP access only. If in step S802, the uplink data flow does not satisfy the ATSSS rule #1, then the process proceeds to a next ATSSS rule until step S805.

In step S805, the UE would determine whether an uplink data flow would satisfy ATSSS rule #N which has been configured as redundant steering mode. If yes, then in step S806, the UE would send all packets to both the 3GPP access network and the non-3GPP access network. If in step S805, the UE has determined that the uplink data flow would not satisfy ATSSS rule #N, then the process proceeds to step S807. In step S807, the UE would determine whether an uplink data flow would satisfy a default ATSSS rule which has been configured as the best-access steering mode. If yes, then in step S808, the UE would steer the data flow to the access network having the best performance.

Figure 9:
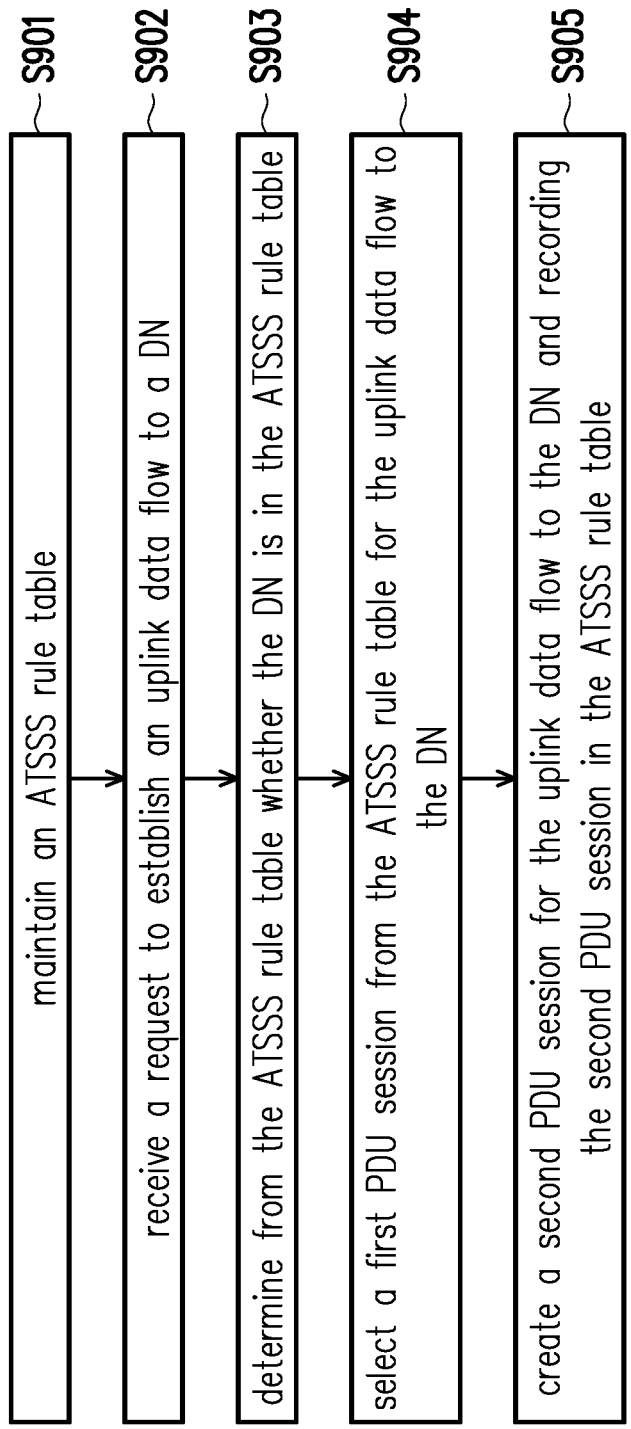
FIG. 9 illustrates a method of distributing data flow between different access networks in a 5G communication system from the perspective of a UE in accordance with one of the exemplary embodiments of the disclosure.

FIG. 9 illustrates a method of distributing data flow between different access networks in a 5G communication system from the perspective of a UE in accordance with one of the exemplary embodiments of the disclosure. In step SS901, an ATSSS table is assumed to have existed in the UE or previously generated by the UE according to URSP provided by PCF, and the UE would maintain an ATSSS rules table. In step SS902, the UE would receive a request to establish an uplink data flow to a DN. In step S903, the UE would determine from the ATSSS rule table whether the DN is in the ATSSS rule table. In step S904, the UE would select a first PDU session from the ATSSS rule table for the uplink data flow to the DN. In step S905, the UE would create a second PDU session for the uplink data flow to the DN and record the second PDU session in the ATSSS rule table.

According to one of the exemplary embodiments, the UE may receive a request to switch the uplink data flow to the data network (DN) from a first type of access network to a second type of access network. The first type of access network could be a 3GPP access network such as 5G-RAN, the second type of access network could be a non-3GPP access network such as Wi-Fi, and vice versa. The UE may determine from the ATSSS rule table whether the second type of access network is already linked with the DN according to the ATSSS rule table in response to receiving the request to switch the uplink data flow to the second type of access network. The UE may select a third packet data unit PDU session which belongs to the second type of access network from the ATSSS rule table for the uplink data flow to the DN in response to having been determined that second type of access network is already linked with the DN according to the ATSSS rule table. Otherwise, the UE may create a fourth PDU session for the uplink data flow to the DN and recording the forth PDU session in the ATSSS rule table in response to having been determined that second type of access network is not linked with the DN according to the ATSSS rule table.

According to one of the exemplary embodiments, the UE may receiving a request to split a portion of the uplink data flow to the DN from the first PDU session or the second PDU session of a first type of access network into a third PDU session of a second type of access network. The UE may determine from the ATSSS rule table whether the second type of access network is already linked with the DN according to the ATSSS rule table in response to receiving the request to split the portion of the uplink data flow to the DN. Next, the UE may select a third PDU session which belongs to the second type of access network from the ATSSS rule table for transmitting the portion of the uplink data flow to the DN in response to having been determined that second type of access network is already linked with the DN according to the ATSSS rule table. Otherwise, the UE may create a fourth PDU session for the uplink data flow to the DN and recording the forth PDU session in the ATSSS rule table for transmitting the portion of the uplink data flow to the DN in response to having been determined that second type of access network is not linked with the DN according to the ATSSS rule table.

The above described ATSSS rule table could be generated by the UE according to URSP rules received from the 5G communication system and may include one or more DNs as each DN is associated with multiple types of access networks, and each type of access network is associated with one or more PDU sessions. The above described PDU session could be a part of a MA-PDU session which distributes the uplink data flow into a first access network and a second network by selecting a steer mode among a plurality of steering modes.

According to one of the exemplary embodiments, one of the plurality of steering modes could be an active-standby steering mode in which one of the first access network and the second access network is active while the other one is in standby. Alternatively, one of the plurality of steering modes could be a priority based steering mode in which the uplink data flow is distributed into the first access network and the second access network based on whether the first access network is higher priority or is lower priority relative to the second access network. Alternatively, one of the plurality of steering modes could be a best access steering mode in which the uplink data flow is distributed into the first access network and the second access network based on whether the first access network has better performance or has worse performance relative to the second access network. Alternatively, one of the plurality of steering modes could be a redundant steering mode in which the uplink data flow is identically distributed into both the first access network and the second access network. Alternatively, one of the plurality of steering modes could be a load-balance steering mode in which the uplink data flow is evenly distributed into both the first access network and the second access network.

Figure 10:
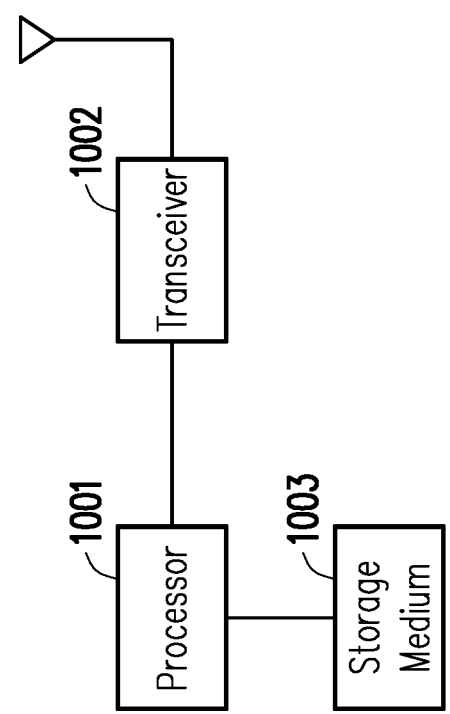
FIG. 10 illustrates the hardware diagram of a UE that uses the method of FIG. 9 in accordance with one of the exemplary embodiments of the disclosure.

FIG. 10 illustrates the hardware diagram of a UE that uses the method of FIG. 9 in accordance with one of the exemplary embodiments of the disclosure. The UE may include not limited to a hardware processor 1001 electrically connected to a transceiver 1002 and a non-transitory storage medium. The hardware processor 1001 is electrically connected to the hardware transceiver 1002 and configured at least for implementing the method of FIG. 9 as well as its exemplary embodiments and alternative variations. The hardware transceiver 1002 may include one or more transmitters and receivers configured to transmit and receive signals respectively in the radio frequency or in the mmWave frequency. The hardware transceiver 1002 may also perform operations such as low noise amplifying, impedance matching, frequency mixing, up or down frequency conversion, filtering, amplifying, and so forth. The hardware transceiver 1002 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 1002 may further include an antenna array which may include one or multiple antennas to transmit and receive omni-directional antenna beams or directional antenna beams.

The hardware processor 1001 is configured to process digital signals and to perform procedures of the proposed method of network slicing in accordance with the proposed exemplary embodiments of the disclosure. The hardware processor 1001 could be implemented by using programmable units such as a micro-processor, a micro-controller, a DSP chips, FPGA, etc. The functions of the hardware processor 1001 may also be implemented with separate electronic devices or ICs. It should be noted that the functions of hardware processor 1001 may be implemented with either hardware or software.

The term UE in this disclosure could be a mobile station, an advanced mobile station (AMS), a server, a client, a desktop computer, a laptop computer, a network computer, a workstation, a personal digital assistant (PDA), a tablet, a personal computer (PC), a scanner, a (smart) telephone device, a watch, a pager, a camera, a television, a hand-held video game device, a musical device, a wireless sensor, a drone, and the like. In some applications, a UE may be a fixed computer device operating in a mobile environment, such as a bus, a train, an airplane, a boat, a car, and so forth.

In view of the aforementioned descriptions, the present disclosure is suitable for being used in a 5G wireless communication system and is able to allow a UE to have an improved multi-access wireless ability.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method used by a user equipment (UE) for distributing uplink data flow between different access networks in a fifth generation (5G) communication system, the method comprising:
   maintaining an Access Traffic Steering, Switching, and Splitting (ATSSS) rules table;
   receiving a request to establish an uplink data flow to a data network (DN);
   determining from the ATSSS rule table whether the DN is in the ATSSS rule table in response to receiving the request to establish the uplink data flow to the DN;
   selecting a first packet data unit (PDU) session from the ATSSS rule table for the uplink data flow to the DN in response to having been determined that the DN is in the ATSSS rule table;
   creating a second PDU session for the uplink data flow to the DN and recording the second PDU session in the ATSSS rule table in response to having been determined that the DN is not in the ATSSS rule table;
   receiving a request to switch the uplink data flow to the data network (DN) from a first type of access network to a second type of access network;
   determining from the ATSSS rule table whether the second type of access network is already linked with the DN according to the ATSSS rule table in response to receiving the request to switch the uplink data flow to the second type of access network;
   selecting a third packet data unit (PDU) session which belongs to the second type of access network from the ATSSS rule table for the uplink data flow to the DN in response to having been determined that second type of access network is already linked with the DN according to the ATSSS rule table; and
   creating a fourth PDU session for the uplink data flow to the DN and recording the fourth PDU session in the ATSSS rule table in response to having been determined that second type of access network is not linked with the DN according to the ATSSS rule table.

2. The method of claim 1, wherein ATSSS rule table is generated by the UE according to User Routing Selection Policy (URSP) rules received from the 5G communication system and comprises one or more DNs as each DN is associated with multiple types of access networks, and each type of access network is associated with one or more PDU sessions.

3. The method of claim 1, wherein the first PDU session is a multiple access PDU (MA-PDU) session which distributes the uplink data flow into a first access network and a second network by selecting a steer mode among a plurality of steering modes.

4. The method of claim 3, wherein one of the plurality of steering modes is an active-standby steering mode in which one of the first access network and the second access network is active while the other one is in standby.

5. The method of claim 4, wherein one of the plurality of steering modes is a priority based steering mode in which the uplink data flow is distributed into the first access network and the second access network based on whether the first access network is higher priority or is lower priority relative to the second access network.

6. The method of claim 4, wherein one of the plurality of steering modes is a best access steering mode in which the uplink data flow is distributed into the first access network and the second access network based on whether the first access network has better performance or has worse performance relative to the second access network.

7. The method of claim 4, wherein one of the plurality of steering modes is a redundant steering mode in which the uplink data flow is identically distributed into both the first access network and the second access network.

8. The method of claim 4, wherein one of the plurality of steering modes is a load-balance steering mode in which the uplink data flow is evenly distributed into both the first access network and the second access network.

9. A method used by a user equipment (UE) for distributing uplink data flow between different access networks in a fifth generation (5G) communication system, the method comprising:
- maintaining an Access Traffic Steering, Switching, and Splitting (ATSSS) rules table;
- receiving a request to establish an uplink data flow to a data network (DN);
- determining from the ATSSS rule table whether the DN is in the ATSSS rule table in response to receiving the request to establish the uplink data flow to the DN;
- selecting a first packet data unit (PDU) session from the ATSSS rule table for the uplink data flow to the DN in response to having been determined that the DN is in the ATSSS rule table;
- creating a second PDU session for the uplink data flow to the DN and recording the second PDU session in the ATSSS rule table in response to having been determined that the DN is not in the ATSSS rule table;
- receiving a request to split a portion of the uplink data flow to the DN from the first PDU session or the second PDU session of a first type of access network into a third PDU session of a second type of access network;
- determining from the ATSSS rule table whether the second type of access network is already linked with the DN according to the ATSSS rule table in response to receiving the request to split the portion of the uplink data flow to the DN;
- selecting a third packet data unit (PDU) session which belongs to the second type of access network from the ATSSS rule table for transmitting the portion of the uplink data flow to the DN in response to having been determined that second type of access network is already linked with the DN according to the ATSSS rule table; and
- creating a fourth PDU session for the uplink data flow to the DN and recording the forth PDU session in the ATSSS rule table for transmitting the portion of the uplink data flow to the DN in response to having been determined that second type of access network is not linked with the DN according to the ATSSS rule table.

10. The method of claim 9, wherein the first type of access network is a base station of the 5G communication system, and the second type of access network is an access point of a free spectrum.

11. A user equipment (UE) comprising:
a transceiver; and
a processor coupled to the transceiver and configured to:
- maintain an Access Traffic Steering, Switching, and Splitting (ATSSS) rules table;
- receive a request to establish an uplink data flow to a data network (DN);
- determine from the ATSSS rule table whether the DN is in the ATSSS rule table in response to receiving the request to establish the uplink data flow to the DN;
- select a first packet data unit (PDU) session from the ATSSS rule table for the uplink data flow to the DN in response to having been determined that the DN is in the ATSSS rule table;
- create a second PDU session for the uplink data flow to the DN and recording the second PDU session in the ATSSS rule table in response to having been determined that the DN is not in the ATSSS rule table;
- receive a request to switch the uplink data flow to the data network (DN) from a first type of access network to a second type of access network;
- determine from the ATSSS rule table whether the second type of access network is already linked with the DN according to the ATSSS rule table in response to receiving the request to switch the uplink data flow to the second type of access network;
- select a third packet data unit (PDU) session which belongs to the second type of access network from the ATSSS rule table for the uplink data flow to the DN in response to having been deteiinined that second type of access network is already linked with the DN according to the ATSSS rule table; and
- create a fourth PDU session for the uplink data flow to the DN and recording the fourth PDU session in the ATSSS rule table in response to having been determined that second type of access network is not linked with the DN according to the ATSSS rule table.

12. The UE of claim 11, wherein the ATSSS rule table is generated by the processor according to User Routing Selection Policy (URSP) rules received from the 5G communication system and comprises one or more DNs as each DN is associated with multiple types of access networks, and each type of access network is associated with one or more PDU sessions.

13. The UE of claim 11, wherein the first PDU session is a multiple access PDU (MA-PDU) session which distributes the uplink data flow into a first access network and a second network by selecting a steer mode among a plurality of steering modes.

14. The UE of claim 13, wherein one of the plurality of steering modes is an active-standby steering mode in which one of the first access network and the second access network is active while the other one is in standby.

15. The UE of claim 13, wherein one of the plurality of steering modes is a priority based steering mode in which the uplink data flow is distributed into the first access network and the second access network based on whether the first access network is higher priority or is lower priority relative to the second access network.

16. The UE of claim 13, wherein one of the plurality of steering modes is a best access steering mode in which the uplink data flow is distributed into the first access network and the second access network based on whether the first access network has better performance or has worse performance relative to the second access network.

17. The UE of claim 13, wherein one of the plurality of steering modes is a redundant steering mode in which the uplink data flow is identically distributed into both the first access network and the second access network.

18. The UE of claim 13, wherein one of the plurality of steering modes is a load-balance steering mode in which the uplink data flow is evenly distributed into both the first access network and the second access network.

19. A user equipment (UE) comprising:
a transceiver; and
a processor coupled to the transceiver and configured to:
- maintain an Access Traffic Steering, Switching, and Splitting (ATSSS) rules table;
- receive a request to establish an uplink data flow to a data network (DN);

determine from the ATSSS rule table whether the DN is in the ATSSS rule table in response to receiving the request to establish the uplink data flow to the DN;

select a first packet data unit (PDU) session from the ATSSS rule table for the uplink data flow to the DN in response to having been determined that the DN is in the ATSSS rule table;

create a second PDU session for the uplink data flow to the DN and recording the second PDU session in the ATSSS rule table in response to having been determined that the DN is not in the ATSSS rule table;

receive a request to split a portion of the uplink data flow to the DN from the first PDU session or the second PDU session of a first type of access network into a third PDU session of a second type of access network;

determine from the ATSSS rule table whether the second type of access network is already linked with the DN according to the ATSSS rule table in response to receiving the request to split the portion of the uplink data flow to the DN;

select a third packet data unit (PDU) session which belongs to the second type of access network from the ATSSS rule table for transmitting the portion of the uplink data flow to the DN in response to having been determined that second type of access network is already linked with the DN according to the ATSSS rule table; and create a fourth PDU session for the uplink data flow to the DN and recording the forth PDU session in the ATSSS rule table for transmitting the portion of the uplink data flow to the DN in response to having been determined that second type of access network is not linked with the DN according to the ATSSS rule table.

20. The UE of claim 19, wherein the first type of access network is a base station of the 5G communication system, and the second type of access network is an access point of a free spectrum.

* * * * *